(12) United States Patent
Surazhsky et al.

(10) Patent No.: US 9,792,673 B2
(45) Date of Patent: Oct. 17, 2017

(54) FACILITATING PROJECTION PRE-SHAPING OF DIGITAL IMAGES AT COMPUTING DEVICES

(71) Applicant: INTEL CORPORATION, Santa Clara, CA (US)

(72) Inventors: Vitaly Surazhsky, Yokneam Illit (IL); Ron Kimmel, Haifa (IL); Alex Bronstein, Haifa (IL); Michael Bronstein, Lugano (CH); Erez Sperling, Menashe (IL); Aviad Zabatani, Even Yehuda (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/865,166

(22) Filed: Sep. 25, 2015

(65) Prior Publication Data

US 2017/0091910 A1    Mar. 30, 2017

(51) Int. Cl.
G06K 9/40 (2006.01)
G06T 5/00 (2006.01)
H04N 9/31 (2006.01)

(52) U.S. Cl.
CPC ............... *G06T 5/003* (2013.01); *H04N 9/31* (2013.01)

(58) Field of Classification Search
CPC ................. G06T 7/0051; G06T 7/0075; G06T 2207/10028; G06T 2207/10012; G06T 2200/04; G06T 19/00; G06T 5/001; G06T 5/003; H04N 2013/0081; G06K 9/3241
See application file for complete search history.

(56) References Cited

U.S. PATENT DOCUMENTS

| 6,928,182 B1 * | 8/2005 | Chui ..................... G06T 7/0083 345/613 |
| 2003/0043347 A1 * | 3/2003 | Orozco .................. G03B 21/00 353/31 |
| 2010/0188478 A1 * | 7/2010 | Robinson ................. H04N 7/15 348/14.16 |

\* cited by examiner

*Primary Examiner* — Eueng-Nan Yeh
(74) *Attorney, Agent, or Firm* — Alpine Technology Law Group LLC

(57) ABSTRACT

A mechanism is described for facilitating management of image noise in digital images using a smart noise management filter according to one embodiment. A method of embodiments, as described herein, includes detecting a digital image of an object, where detecting further includes detecting a pattern signal associated with the digital image. The method may further include measuring a spread function relating to at least one of the digital image and an imaging system of a computing device, where measuring further includes determining deconvolution of the spread function, and where measuring further includes computing a pre-shaping filter based on the deconvolution of the spread function. The method may further include executing the pre-shaping filter to apply the pattern signal to the deconvolution of the spread function to obtain a pre-shaped projection pattern of the digital image.

24 Claims, 6 Drawing Sheets

FACILITATING PROJECTION PRE-SHAPING OF DIGITAL IMAGES AT COMPUTING DEVICES

FIELD

Embodiments described herein generally relate to computers. More particularly, embodiments relate to facilitating projection pre-shaping of digital images at computing devices.

BACKGROUND

It is well known that projected patterns, such as patterns of black/white stripes, suffer from distortions. Certain conventional techniques attempt at improving sharpness of digital images; however, such conventional techniques are applied late in the overall process and thus they are computationally intensive, cumbersome, and inaccurate.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for pre-shaping any transitions between stripes, such as black and white stripes, of projected patterns to sharpen the relevant captured/received image. This novel technique allows for a significant improvement in localization of the transition contours and promotes accuracy of depth estimation along these transitions curves. In one embodiment, the patterns are pre-shaped and configured based on a spread function relating to various elements of the camera-projector imaging system, such as a projector, a camera, lenses, etc. For example, this novel technique enables increased sharpness of digital images, where this increased sharpness further enables increased accuracy of depth detection along transition curves. Such transition curves are regarded as crucial in defining the accuracy of the depth capturing imaging system, such as one or more of depth sensors, depth-sensing cameras (e.g., Intel® RealSense™, etc.), ranging cameras, time-of-flight (ToF) cameras, etc.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to digital images, projections, black/white stripes, pre-shaping, filters, measurements, tracking, progress, 3D models, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
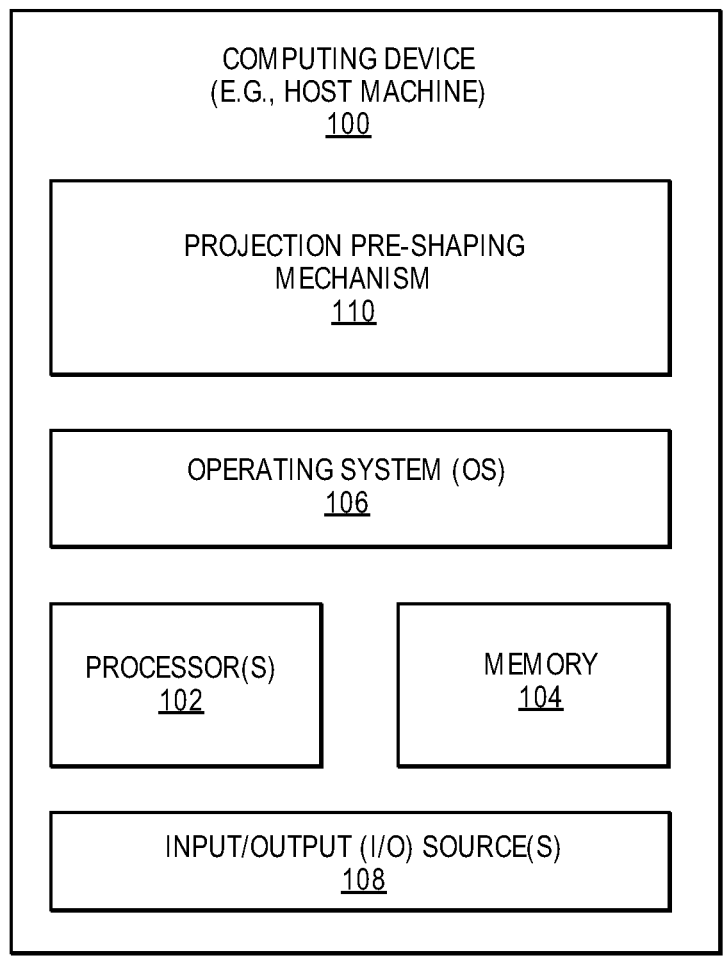
FIG. 1 illustrates a computing device employing a projection pre-shaping mechanism according to one embodiment.
Figure 2:
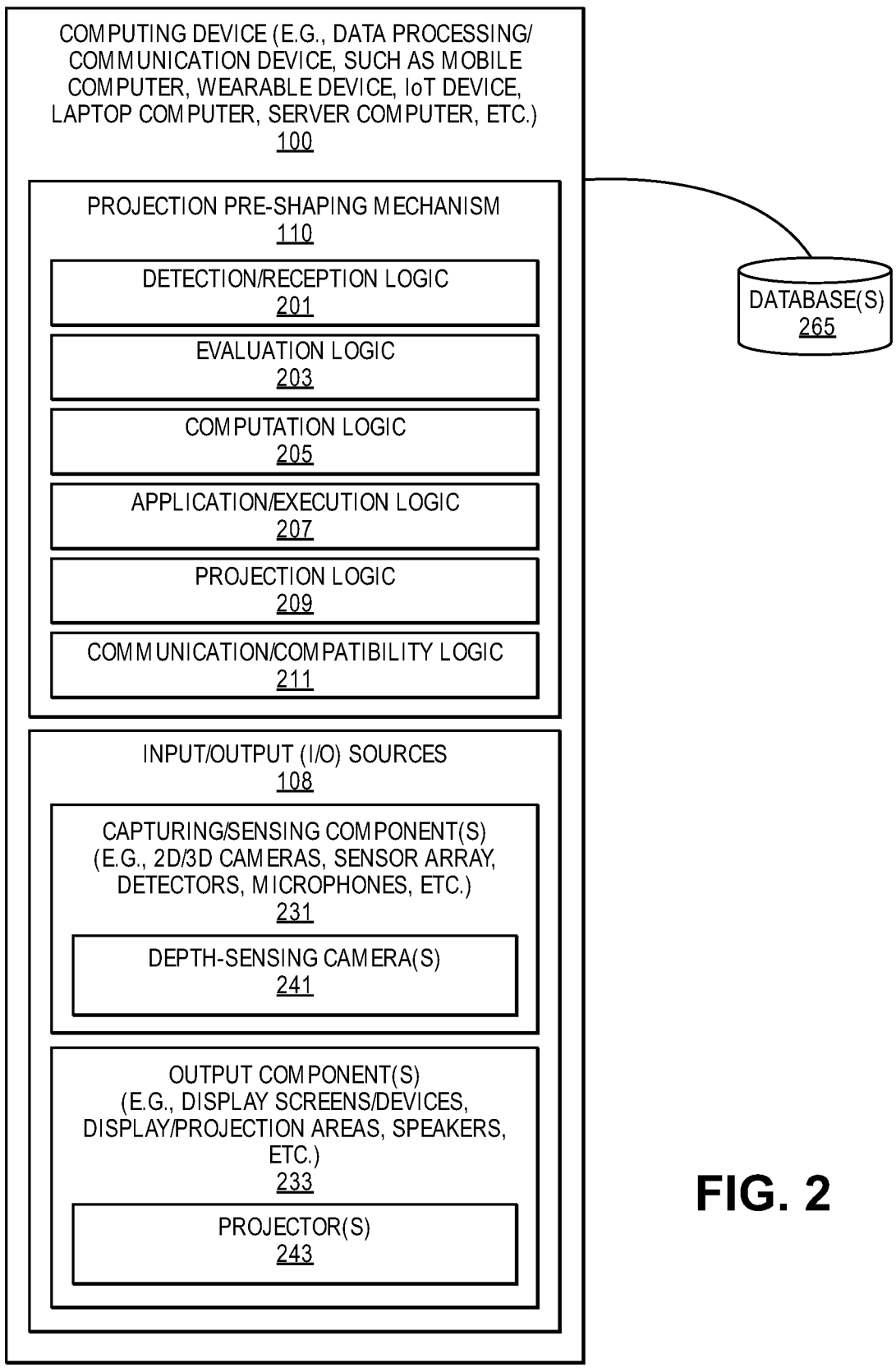
FIG. 2 illustrates a projection pre-shaping mechanism according to one embodiment.

FIG. 1 illustrates a computing device 100 employing a projection pre-shaping mechanism 110 according to one embodiment. Computing device 100 servers a host machine for hosting projection pre-shaping mechanism 110 that may include any number and type of components, as illustrated in FIG. 2, to facilitate intelligent and dynamic pre-shaping of transition stripes for sharper digital images that are captured using one or more of depth sensors, depth-sensing cameras (e.g., Intel® RealSense™, etc.), ranging cameras, time-of-flight (ToF) cameras, etc., to enhance user experience by offering sharper images, as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, smart windshields, smart windows, head-mounted displays (HMDs) (e.g., optical head-mounted display (e.g., wearable glasses, head-mounted binoculars, gaming displays, military headwear, etc.), and other wearable devices (e.g., smartwatches, bracelets, smartcards, jewelry, clothing items, etc.), etc.

It is contemplated and to be noted that embodiments are not limited to computing device 100 and that embodiments may be applied to and used with any form or type glass that is used for viewing purposes, such as smart windshields, smart windows (e.g., smart window by Samsung®, etc.), and/or the like. Similarly, it is contemplated and to be noted that embodiments are not limited to any particular type of computing device and that embodiments may be applied and used with any number and type of computing devices; however, throughout this document, the focus of the discussion may remain on wearable devices, such as wearable glasses, etc., which are used as examples for brevity, clarity, and ease of understanding.

In some embodiments, computing device 100 may include a large(r) computing system (e.g., server computer, desktop computer, laptop computer, etc.), such that a flexible display screen may be part of this large(r) computing system where the flexible display screen may be a part or an extension screen of a main display screen, where the main screen itself may be flexible or static.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as one or more touchable and/or non-touchable flexible display screen(s) (e.g., foldable screens, roll-able screens, bendable screens, curve-able screens, etc.), touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

FIG. 2 illustrates a projection pre-shaping mechanism 110 according to one embodiment. In one embodiment, projection pre-shaping mechanism 110 may include any number and type of components, such as (without limitation): detection/reception logic 201; evaluation logic 203; computation logic 205; application/execution logic 207; projection logic 209; and communication/compatibility logic 211. Computing device 100 is further shown as hosting input/output source(s) 108 having capturing/sensing components 231 including depth camera(s) 241, sensors, detectors, microphones, etc., and output sources 233 including one or more projector(s) 243, display devices, speakers, etc.

In one embodiment, projection pre-shaping mechanism 110 may be hosted by computing device 100, such as a communication/data processing device including a mobile computer (e.g., smartphone, tablet computer, etc.), a wearable computers (e.g., wearable glasses, smart bracelets, smartcards, smart watches, HMDs, etc.), an Internet of Things (IoT) devices, and/or the like. In another embodiment, computing device 100 may be a larger communication machine, such as a server computer, a desktop computer, a laptop computer, etc. In one embodiment, computing device 100 may be in communication with one or more other computing devices (also referred to as "personal devices"), such as mobile computers, wearable devices, etc., over communication medium, such as one or more networks (e.g., cloud network, the Internet, proximity network, such as Bluetooth, etc.).

For example and in one embodiment, computing device 100 may serve as a server computer hosting projection pre-shaping mechanism 110 in its entirety while communicating one or more services offered by projection pre-shaping mechanism 110 with one or more other devices, such as client/personal devices, over communication medium, such as a cloud network. In another embodiment, computing device 100 itself may be another personal device having projection pre-shaping mechanism 110, either partially or entirely, as part or in support of a software application (also referred to as software application, "application" or "client-based application") including a projection pre-shaping (PS) application or a non-PS application or any other type of software application, such as a web browser, which may be downloadable or accessible over one more networks.

I/O source(s) 108 include capturing/sensing component(s) 231 and output component(s) 233 which, as will be further described below, may also include any number and type of components, sensor arrays, detectors, displays, etc. For example, capturing/sensing components 231 may include (without limitation) depth-sensing camera(s) (e.g., Intel® RealSense™ camera, etc.), two-dimensional (2D) cameras, three-dimensional (3D) cameras, sensor arrays (such as context/context-aware sensors and environmental sensors, such as camera sensors, ambient light sensors, Red Green Blue (RGB) sensors, movement sensors, etc.), image sources, audio/video/signal detectors, microphones, eye/gaze-tracking systems, head-tracking systems, etc.), etc., while, output components 233 may include (without limitation) projector(s) 243, display/projection areas, audio/video/signal sources, display planes, display panels, display screens/devices, projectors, display/projection areas, speakers, etc. For example and in one embodiment, capturing/sensing components 231 may further include one or more depth-sensing cameras, such as Intel® RealSense™ camera, etc.

Computing device 100 may be further in communication with one or more repositories or data sources or databases, such as database(s) 265, to obtain, communicate, store, and maintain any amount and type of data (e.g., convoluation data, deconvolution data, transition stripes data, shaping data, pre-shaping data, captured digital images, projection data, recommendations, predictions, data tables, data maps, media, metadata, templates, real-time data, historical contents, user and/or device identification tags and other information, resources, policies, criteria, rules, regulations, upgrades, etc.).

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

In one embodiment, a projector, such as projector 243 (e.g., intelligent vision camera (IVCAM) projector), projects patterns of black/white stripes that are reflected from an object and captured by a camera, such as camera 241. Any transitions between these black and white strips (also referred to as "edges") may appear as contours in the captured image of the object, where any depth can be accurately determined along these transition curves. It is contemplated that transitions between the blacks and the whites of the stripes captured by camera 241 may be subject to smoothing effects due to the optical system point spread function ("PSF" or "spread function") or point spread characteristics. Any number and type of elements may be regarded as sources of distortion in these transitions, where such elements may include (without limitation) system lenses, imaging array crosstalk of pixel array, electric system transitions of the projected patterns, etc., as well as other factors that can be accurately measured and evaluated.

As will be further illustrated with reference to FIG. 3, a spread width (e.g., rise length) of the black/white transition in a capture image that is acquired by camera 241 may result from a spread function of one or more I/O components 108, such as projector 243, the lens, camera 241, and/or the like. In image and signal processing, deconvolution refers to an algorithm-based process that is used to reverse the effects of convolution or recorded data, where convolution refers to functional analysis of multiple original functions, producing a new function that is generally regarded as a modified version of at least one of the original functions, which gives the area overlap between the original functions as a function of the amount that one of the original functions is translated. For example, the process of deconvolution may be initiated or applied to seek a solution for a convolution equation as follows: f*g=h, where h is recorded signal, f is a signal that needs to be recovered but has been convolved with another signal, g, before being recorded. Further, g represents a transfer function and if g is known, deterministic deconvolution may be measured, but if g is unknown, an estimated or approximate deconvolution is measured as facilitated by computation logic 205.

In one embodiment, instead of performing deconvolution to enhance a digital image after being captured by camera 241, a pre-shaping of any transitions between the black/white stripes of the projected patterns is performed, as facilitated by projection pre-shaping mechanism 110, so that the captured image may be made as sharp as possible. This novel technique substantially improves the localization of the transition contours and the accuracy of the depth estimated along these transition curves.

In one embodiment, once a digital image of an object is captured by camera 241, it is detected by detection/reception logic 201. It is contemplated and as described earlier that initially, this captured image may have any number and type of distortions, such as blurring, etc., as detected by detection/reception logic 201, which may be caused by any one or more of system lenses, other optical elements like imaging array crosstalk of a pixel array, as well as an electric system transitions of the projected patterns along with other factors that can be accurately measured and evaluated. These transitions between any back and white stripes that are reflected from the object, captured by camera 241, detected by detection/reception logic 201, while their patterns are expected to be projected by projector 243 appear as contours in the captured image, where the depth of such contour-like transitions along with any transitions curves is accurately determined by one or more depth sensor of camera 241.

Further, a spread width (e.g., rise length) of the black/white transitions in the captured image may be acquired by the camera and result from a spread function, such as PSF, of one or more of projector 243, camera 241, lenses, and/or the like. In one embodiment, the digital image and its various features, such as transitions, distortions, deficiencies, etc., may be evaluated by evaluation logic 203 and any relevant data may be forwarded on to computation logic 205 for further processing.

To significantly improve localization of the transition contours and the accuracy of the depth estimated long these transition curves, in one embodiment, pre-shaping of the transitions between the black and white stripes of projected patterns of the captured image is facilitated so that the captured image may be made as sharp as possible. In one embodiment, upon receiving the relevant data from evaluation logic 203, computation logic 205 may be used to compute spread function relating to the captured image and then, computation logic 205 may be further triggered to compute a pre-shaped filter based on the spread function of the computing device 100 (e.g., projector 243, camera 241, lenses, etc.), where the pre-shaped filter may be used for pre-shaping and configuration of the potential projected patterns in a projected signal based on the spread function.

Once the pre-shaped filter is generated by computation logic 205, it is then applied by application/execution logic 207 to effectively pre-shape the projected signal by, in one embodiment, replacing the black regions with dark gray regions, while replacing the white regions with bright gray regions. In one embodiment, application/execution logic 207 to facilitate manipulation of transitions or transition profiles by introducing overshoots and undershoots which, in turn, may be convolved with the spread function and yields a desired sharp transition to sharpen the captured image. As computed by computation logic 205, the spread function is accordingly calibrated by application/execution logic 207 to sharpen the stripes image such that the application of the spread function, as facilitated by application/execution logic 207, yields the resulting image to be as sharp as possible.

In one embodiment, the reshaping results may be validated using a calibration pattern as facilitated by projection logic 209. For example during use, projector 243 may be configured by projection logic 209 to project the pre-shaped pattern which may include a smooth (gray-level) transition, such as projecting the calibrated pattern, resulting in a received image having a step function with a sharper transition. In one embodiment, increased sharpness of digitally captured images is enabled, where increased sharpness enables increased accuracy of depth detected along the transition curves. These transition curves are crucial in defining the accuracy of the depth capturing system as facilitated by depth-sensing camera 241.

Communication/compatibility logic 211 may be used to facilitate dynamic communication and compatibility between computing device 100, database(s) 265, communication medium, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "image", "digital image", "depth-sensing camera", "projector", "object", "pre-shaping", "pre-shape filter", "sharpness", "convolution", "deconvolution", "spread function", "PSF", "user", "user profile", "user preference", "user", "sender", "receiver", "personal device", "smart device", "mobile computer", "wearable device", etc., should not be read to limit embodiments to software or devices that carry that label in products or in literature external to this document.

It is contemplated that any number and type of components may be added to and/or removed from projection pre-shaping mechanism 110 to facilitate various embodiments including adding, removing, and/or enhancing certain features. For brevity, clarity, and ease of understanding of projection pre-shaping mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
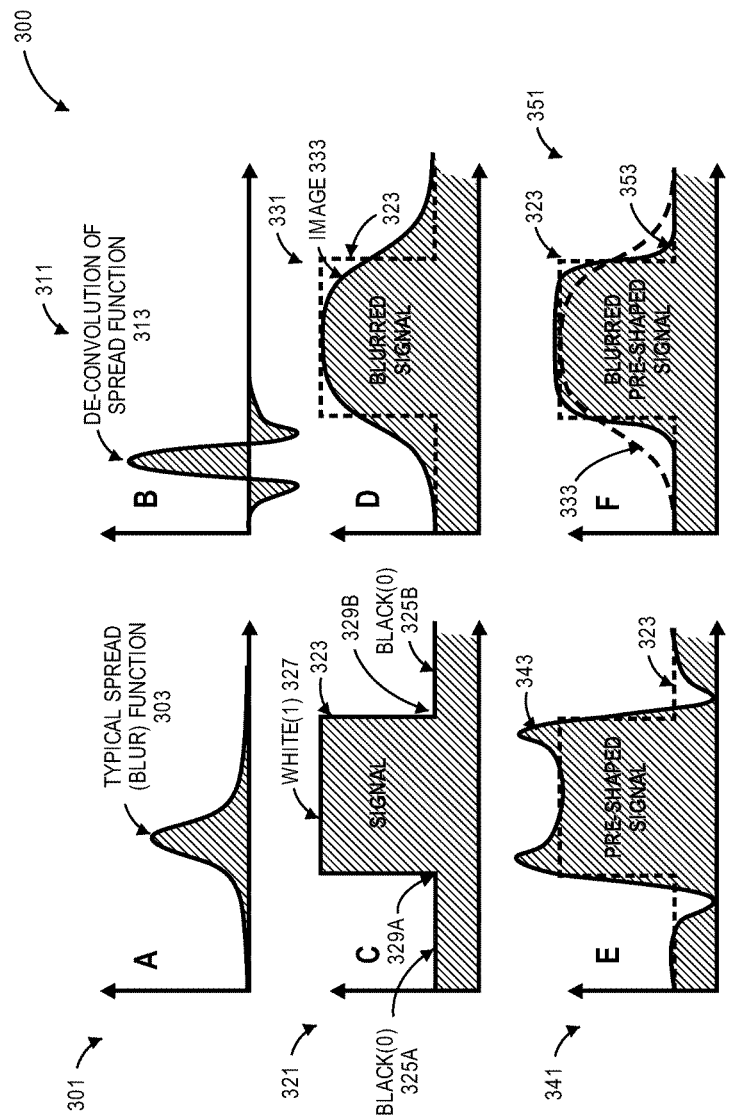
FIG. 3 illustrates a transaction sequence for facilitating projection pre-shaping of digital images according to one embodiment.

FIG. 3 illustrates a transaction sequence 300 having processes A 301, B 311, C 321, D 331, E 341, F 351 for facilitating projection pre-shaping of digital images according to one embodiment. Transaction sequence 300 may be performed by processing logic that may comprise hardware (e.g., circuitry, dedicated logic, programmable logic, etc.), software (such as instructions run on a processing device), or a combination thereof, as facilitated by projection pre-shaping mechanism 110 of FIGS. 1-2. The processes of transaction sequence 300 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

The various processes A 301, B 311, C 321, D 331, E 341, F 351 of transaction sequence 300 illustrate the effect of a spread function on a captured image and a pre-shaped image profile as facilitated by projection pre-shaping mechanism 110 of FIG. 2. For example, as illustrated, process A 301 includes a typical one-dimensional (1D) spread (blur) function 303 of a system, such as an IVCAM system, including projector 243, lenses, camera 241, and/or the like, as shown in FIG. 2. It is contemplated that the actual spread function may be better described by a 2D profile, while the process A 301 illustrates a figure demonstrating the effect of a 1D transition.

In one embodiment, process B 311 provides for deconvolution 313 of the spread function of spread function 303 of process A 301, where this deconvolution 313 of process B 311 may be regarded as an approximate inverse filter of filter A associated with spread function 303 of process A 301. In one embodiment, process C 321 illustrates a pattern signal, such as signal 323, where the pattern signal includes a black/white/black pattern, such as black 325A, 325B and white 327. When signal 323 is observed from left to right, the values of the profile may be said to be a 0 representing black 325A followed by and transitioning into a 1 representing white 327 and then dropping down and transitioning into a 0 representing black 325B, such as transition 329A and 329B.

In one embodiment, process D 331 illustrates captured or received digital image 333, which includes the effect of the systems spread function, such as spread function 303 of process A 301. For example, as illustrated, image 333 of process D 331 may result from applying spread function 303 of process A 301 to signal 323 of process C 321. As illustrated, capture image 333 has blurred or reduced sharpness at black/white transitions 329A, 329B as produced by signal 323.

In one embodiment, using configured pre-shaped pattern having smooth "gray-level" transitions as facilitated by projection pre-shaping mechanism 110 of FIG. 2, each pattern may be configured based on the spread function, such as spread function 303, of the system, such as projectors, lenses, cameras, etc. As aforementioned, in one embodiment, each pattern is configured to have gray-level at black/white transitions 329A, 329B such that the resulting captured image may have a spread that is as minimal as possible, such as the numerical support of the effect of the resulting spread may be as tight as possible. Further, the power-level of signal 323 includes gray-level values that allow for shaping of transitions 329A, 329B (such as between the black value of 0 and the white value of 1).

In one embodiment, the gray-level values are configured based on spread function 303 of the system as set forth in process A 301, where the pattern may be configured at a calibration stage, as follows: measure and evaluate a spread function of the system, such as spread function 303 of process A 301 as facilitated by computation logic 205 and evaluation logic 203 of FIG. 2. Further, in one embodiment, using computation logic 205 of FIG. 2, a pre-shaping filter may be determined or computed based on spread function 303, such as further based on deconvolution 313 of spread function 303 or an approximation of deconvolution 313 of process B 311.

In one embodiment, using application/execution logic 207, the pre-shaping filter is applied to the projection pattern as in processes C 321 and D 331. For example, process E 341 shows pre-designed pattern 343 that is configured based on deconvolution 313 of spread function 303 and the required pattern signal 323. For example, deconvolution 313 may be regarded as an approximated inverse filter of spread function 303 or a deconvolution of a delta function with respect to spread function 303.

After shaping is performed, in one embodiment, during use, a projector, such as projector 243 of FIG. 2, may be configured to project pre-shaped pattern 343 of process E 341 as facilitated by projection logic 209, where the pre-shaped pattern includes a smooth, gray-level, transition. For example, projecting calibrated pattern 343 of process E 341 may result in a received image 353 of process F 351 having a step function with sharper transitions as opposed to the blurred transitions of image 333 of process D 331. It is contemplated that embodiments are not limited to the shapes, features, components, processes, etc., of this transaction sequence 400 and that any number and type of pre-shaping functions may be obtained and used for achieving varying pre-shaped patterns.

Figure 4:
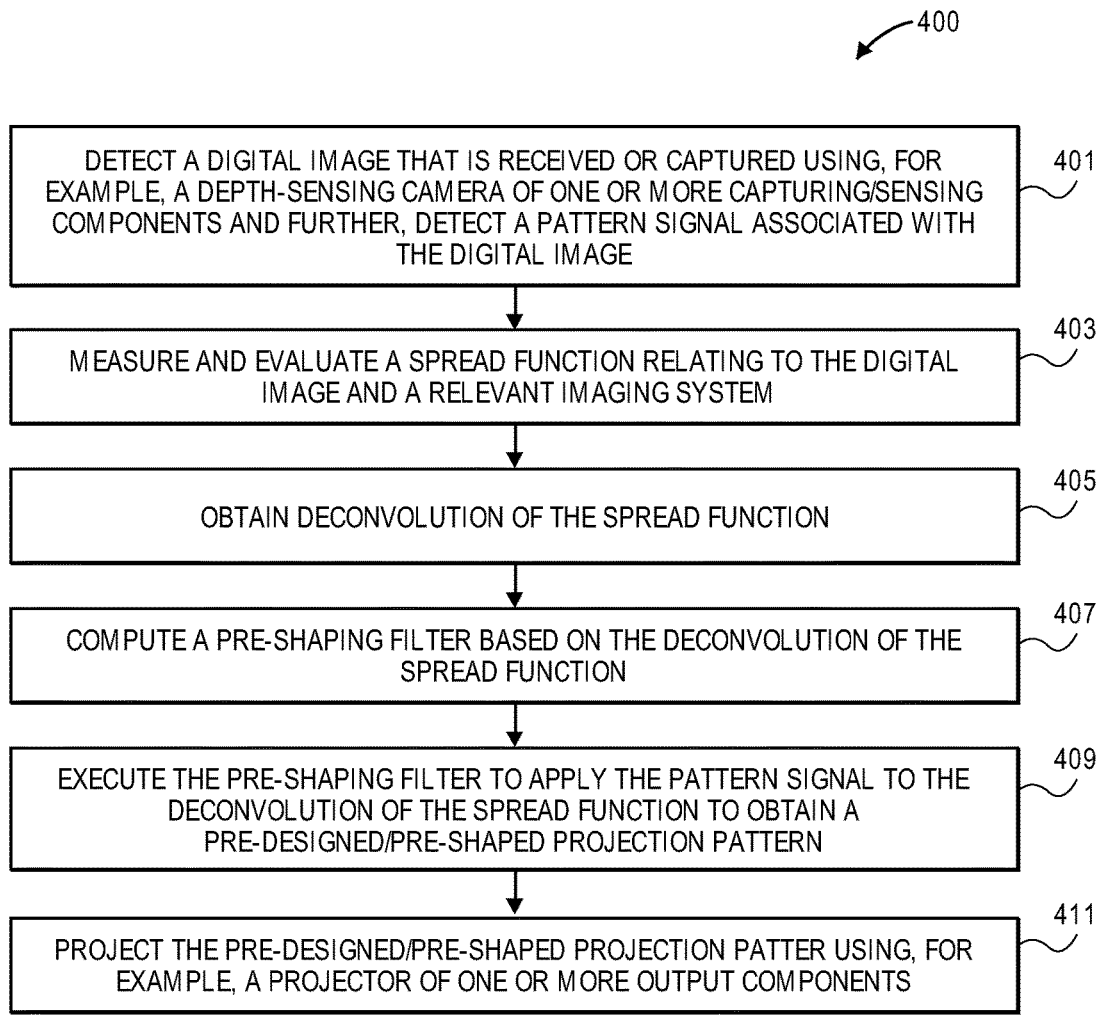
FIG. 4 illustrates a method for facilitating projection pre-shaping of digital images according to one embodiment.

FIG. 4 illustrates a method 400 for facilitating projection pre-shaping of digital images according to one embodiment. Method 400 may be performed by processing logic that may comprise hardware (e.g., circuitry, dedicated logic, programmable logic, etc.), software (such as instructions run on a processing device), or a combination thereof, as facilitated by projection pre-shaping mechanism 110 of FIGS. 1-2. The processes of method 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 400 begins at block 401 with detecting a digital image that is received or captured using one or more capturing/sensing components 221, such as one or more depth-sensing cameras 241, etc., of FIG. 2, wherein detecting further includes detecting a (pattern) signal associated with the digital image. Upon detecting the digital image, at block 403, a spread function of a relevant imaging system may be measured and evaluated, where, for example, the spread (such as blur) function may describe a response of the imaging system to a point source or point object that is regarded as a single identifiable localized source of data. The relevant image system may refer to an entire computing device, such as computing device 100 of FIG. 2, and/or to a set of imaging components hosted by computing device 100, such as one or more cameras 241, one or more camera lenses, one or more projectors 243, etc., of FIG. 2. At block 405, deconvolution of the spread function is obtained, such as to reverse the effects of convolution relating to the digital image.

At block 407, in one embodiment, a pre-shaping filter is computed based on the deconvolution (or an approximation of the deconvolution) of the spread function. In one embodiment, at block 409, the computed pre-shaping filter is executed to apply the pattern signal to the deconvolution of the spread function to obtain a pre-designed/pre-shaped projection pattern that is different from (e.g., sharper than) a typical projection pattern expected to be projection by one or more projectors, such as projector(s) 243 of FIG. 2, where the deconvolution of the spread function may be regarded as an approximated inverse filter of the spread function or a deconvolution of a data function with respect to the spread function. For example, the pre-designed/pre-shaped projection pattern, as facilitated by the application of pre-shaping filter, may include a combination of the pattern signal and the deconvolution of the spread function, while the typical projection pattern may include a combination of the pattern signal and the spread function. Further, in one embodiment, the pre-shaped projection pattern, as obtained through the application of the pre-shaping filter, includes smooth and sharp gray-level transitions as opposed to the rough and blurry black and white transitions of the typical projection pattern.

In one embodiment, at block 411, a projector, such as projector(s) 243 of FIG. 2, may be configured to project the pre-shaped pattern having smooth gray-level transitions, where this projecting of the calibrated pre-shaped pattern may result in the digital image having a step function with a sharper transition, such as in comparison to the typical projection pattern. It is contemplated that embodiments are not limited to the shapes, features, components, processes, etc., of this method 400 and that any number and type of pre-shaping functions may be obtained and used for achieving varying pre-shaped patterns.

Figure 5:
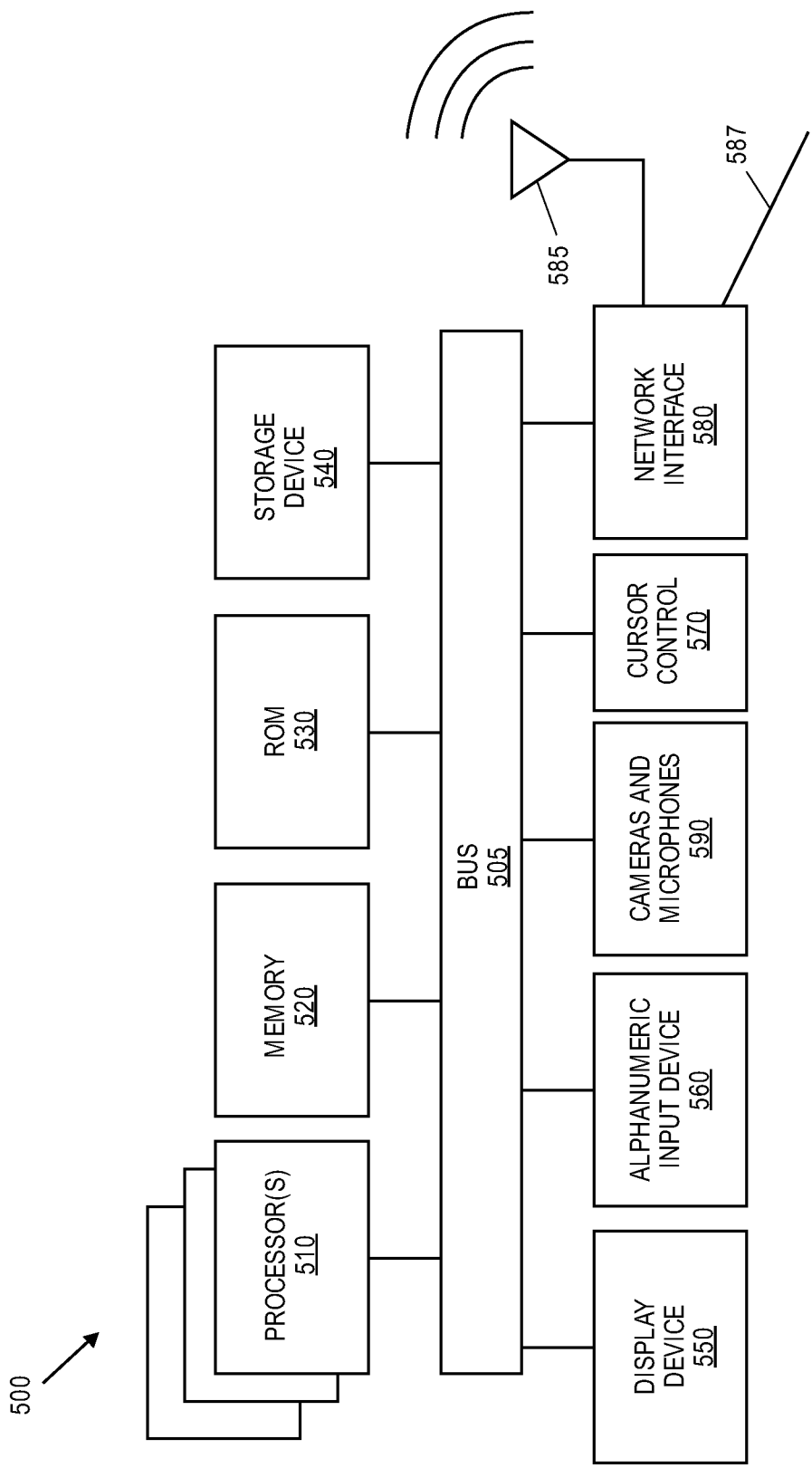
FIG. 5 illustrates computer system suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
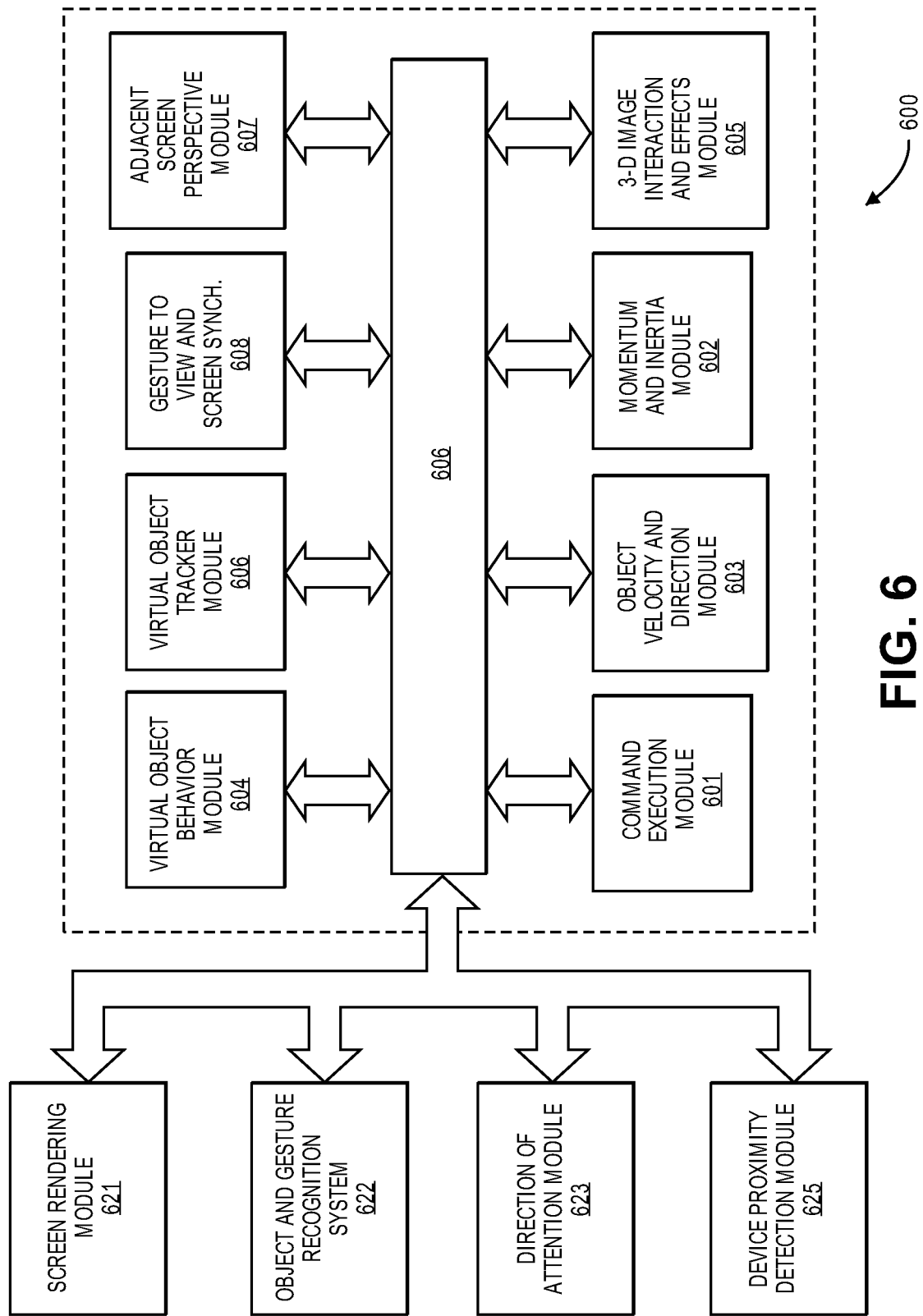
FIG. 6 illustrates computer environment suitable for implementing embodiments of the present disclosure according to one embodiment.

FIG. 6 illustrates an embodiment of a computing environment 600 capable of supporting the operations discussed above. The modules and systems can be implemented in a variety of different hardware architectures and form factors including that shown in FIG. 9.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System, using one or more cameras, without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate management of image noise in digital images using a smart noise management filter, comprising: detection/reception logic to detect a digital image of an object, wherein the detection/reception logic is further to detect a pattern signal associated with the digital image; computation logic to measure a spread function relating to at least one of the digital image and an imaging system of the apparatus, wherein the computation logic is further to determine deconvolution of the spread function, and wherein the computation logic is further to compute a pre-shaping filter based on the deconvolution of the spread function; and application/execution logic to execute the pre-shaping filter to apply the pattern signal to the deconvolution of the spread function to obtain a pre-shaped projection pattern of the digital image.

Example 2 includes the subject matter of Example 1, further comprising projection logic to facilitate a projector of the imaging system to project the digital image based on the pre-shaped projection pattern.

Example 3 includes the subject matter of Example 1, wherein the digital image is received or captured using one or more components of the imaging system, wherein the one or more components include a depth-sensing camera to capture the digital image of the object including a three-dimensional (3D) object.

Example 4 includes the subject matter of Example 1, wherein the spread function is measured based on one or more components of the image system, wherein the one or more components include at least one of the depth-sensing camera, the projector, one or more lenses of the depth-sensing camera, one or more sensors, and one or more detectors.

Example 5 includes the subject matter of Example 1 or 4, wherein the spread function comprises a point spread function (PSF) to describe a response of the one or more components of the imaging system to a point source or a point object relevant to the object.

Example 6 includes the subject matter of Example 1, further comprising evaluation logic to evaluate the digital image to determine one or more deficiencies associated with the digital image, wherein the one or more deficiencies include distortion of blurring of one or more transition portions of the digital image.

Example 7 includes the subject matter of Example 1 or 6, wherein a transition portion of the one or more transitions portions includes transition curves where black region transition into white regions and vice versa.

Example 8 includes the subject matter of Example 7, wherein the pre-shaping filter to filter-out black from the black regions and white from the white regions, and replace the black and the white with dark gray and bright gray, respectively, to sharpen the digital image by improving localization of the transition curves and accuracy of depth estimated along the transition curves, wherein the depth is estimated using the depth-sensing camera.

Some embodiments pertain to Example 9 that includes a method for facilitating management of image noise in digital images using a smart noise management filter, comprising: detecting a digital image of an object, wherein detecting further includes detecting a pattern signal associated with the digital image; measuring a spread function relating to at least one of the digital image and an imaging system of a computing device, wherein measuring further includes determining deconvolution of the spread function, and wherein measuring further includes computing a pre-shaping filter based on the deconvolution of the spread function; and executing the pre-shaping filter to apply the pattern signal to the deconvolution of the spread function to obtain a pre-shaped projection pattern of the digital image.

Example 10 includes the subject matter of Example 9, further comprising projecting, via a projector of the imaging system, the digital image based on the pre-shaped projection pattern.

Example 11 includes the subject matter of Example 9, wherein the digital image is received or captured using one or more components of the imaging system, wherein the one or more components include a depth-sensing camera to capture the digital image of the object including a three-dimensional (3D) object.

Example 12 includes the subject matter of Example 9, wherein the spread function is measured based on one or more components of the image system, wherein the one or more components include at least one of the depth-sensing camera, the projector, one or more lenses of the depth-sensing camera, one or more sensors, and one or more detectors.

Example 13 includes the subject matter of Example 9 or 12, wherein the spread function comprises a point spread function (PSF) to describe a response of the one or more components of the imaging system to a point source or a point object relevant to the object.

Example 14 includes the subject matter of Example 9, further comprising evaluating the digital image to determine one or more deficiencies associated with the digital image, wherein the one or more deficiencies include distortion of blurring of one or more transition portions of the digital image.

Example 15 includes the subject matter of Example 9 or 14, wherein a transition portion of the one or more transitions portions includes transition curves where black region transition into white regions and vice versa.

Example 16 includes the subject matter of Example 15, wherein the pre-shaping filter to filter-out black from the black regions and white from the white regions, and replace the black and the white with dark gray and bright gray, respectively, to sharpen the digital image by improving localization of the transition curves and accuracy of depth estimated along the transition curves, wherein the depth is estimated using the depth-sensing camera.

Some embodiments pertain to Example 17 includes a system comprising a storage device having instructions, and a processor to execute the instructions to facilitate a mechanism to perform one or more operations comprising: detecting a digital image of an object, wherein detecting further includes detecting a pattern signal associated with the digital image; measuring a spread function relating to at least one of the digital image and an imaging system of a computing device, wherein measuring further includes determining deconvolution of the spread function, and wherein measuring further includes computing a pre-shaping filter based on the deconvolution of the spread function; and executing the pre-shaping filter to apply the pattern signal to the deconvolution of the spread function to obtain a pre-shaped projection pattern of the digital image.

Example 18 includes the subject matter of Example 17, wherein the one or more operations further comprise projecting, via a projector of the imaging system, the digital image based on the pre-shaped projection pattern.

Example 19 includes the subject matter of Example 17, wherein the digital image is received or captured using one or more components of the imaging system, wherein the one or more components include a depth-sensing camera to capture the digital image of the object including a three-dimensional (3D) object.

Example 20 includes the subject matter of Example 17, wherein the spread function is measured based on one or more components of the image system, wherein the one or more components include at least one of the depth-sensing camera, the projector, one or more lenses of the depth-sensing camera, one or more sensors, and one or more detectors.

Example 21 includes the subject matter of Example 17 or 20, wherein the spread function comprises a point spread function (PSF) to describe a response of the one or more components of the imaging system to a point source or a point object relevant to the object.

Example 22 includes the subject matter of Example 17, further comprising evaluating the digital image to determine one or more deficiencies associated with the digital image, wherein the one or more deficiencies include distortion of blurring of one or more transition portions of the digital image.

Example 23 includes the subject matter of Example 17 or 22, wherein a transition portion of the one or more transitions portions includes transition curves where black region transition into white regions and vice versa.

Example 24 includes the subject matter of Example 23, wherein the pre-shaping filter to filter-out black from the black regions and white from the white regions, and replace the black and the white with dark gray and bright gray, respectively, to sharpen the digital image by improving localization of the transition curves and accuracy of depth estimated along the transition curves, wherein the depth is estimated using the depth-sensing camera.

Some embodiments pertain to Example 25 includes an apparatus comprising: means for detecting a digital image of an object, wherein detecting further includes detecting a pattern signal associated with the digital image; means for measuring a spread function relating to at least one of the digital image and an imaging system of a computing device, wherein the means for measuring further includes means for determining deconvolution of the spread function, and wherein the means for measuring further includes means computing a pre-shaping filter based on the deconvolution of the spread function; and means executing the pre-shaping filter to apply the pattern signal to the deconvolution of the spread function to obtain a pre-shaped projection pattern of the digital image.

Example 26 includes the subject matter of Example 25, wherein the one or more operations further comprise projecting, via a projector of the imaging system, the digital image based on the pre-shaped projection pattern.

Example 27 includes the subject matter of Example 25, wherein the digital image is received or captured using one or more components of the imaging system, wherein the one or more components include a depth-sensing camera to capture the digital image of the object including a three-dimensional (3D) object.

Example 28 includes the subject matter of Example 25, wherein the spread function is measured based on one or more components of the image system, wherein the one or more components include at least one of the depth-sensing camera, the projector, one or more lenses of the depth-sensing camera, one or more sensors, and one or more detectors.

Example 29 includes the subject matter of Example 25 or 28, wherein the spread function comprises a point spread function (PSF) to describe a response of the one or more components of the imaging system to a point source or a point object relevant to the object.

Example 30 includes the subject matter of Example 25, further comprising evaluating the digital image to determine one or more deficiencies associated with the digital image, wherein the one or more deficiencies include distortion of blurring of one or more transition portions of the digital image.

Example 31 includes the subject matter of Example 25 or 30, wherein a transition portion of the one or more transitions portions includes transition curves where black region transition into white regions and vice versa.

Example 32 includes the subject matter of Example 31, wherein the pre-shaping filter to filter-out black from the black regions and white from the white regions, and replace the black and the white with dark gray and bright gray, respectively, to sharpen the digital image by improving localization of the transition curves and accuracy of depth estimated along the transition curves, wherein the depth is estimated using the depth-sensing camera.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   detection/reception logic to detect a digital image of an object, wherein the detection/reception logic is further to detect a pattern signal associated with the digital image;
   computation logic to measure a spread function relating to at least one of the digital image and an imaging system of the apparatus, wherein the digital image is captured by one or more compounds of the imaging system including a depth-sensing camera,
   wherein the computation logic is further to determine deconvolution of the spread function, and
   wherein the computation logic is further to compute a pre-shaping filter based on the deconvolution of the spread function; and
   application/execution logic to execute the pre-shaping filter to:
   apply the pattern signal to the deconvolution of the spread function to obtain a pre-shaped projection pattern of the digital image, wherein the pre-shaped projection pattern to reveal one or more black regions and one or more white regions of the digital image, and
   filter out black from the one or more black regions and white from the one or more white regions, and replace the filtered-out black and the filtered-out white with dark gray and bright gray, respectively, to sharpen the digital image.

2. The apparatus of claim 1, wherein the digital image is projected by one or more projectors of the imaging system based on the pre-shaped projection pattern.

3. The apparatus of claim 1, wherein the digital image comprises a three-dimensional (3D) object that is received or captured using the one or more components including the depth sensing camera.

4. The apparatus of claim 1, wherein the spread function is measured based on one or more components of the image system, wherein the one or more components include at least one of the depth-sensing camera, a projector, one or more lenses of the depth-sensing camera, one or more sensors, and one or more detectors.

5. The apparatus of claim 4, wherein the spread function comprises a point spread function (PSF) to describe a response of the one or more components of the imaging system to a point source or a point object relevant to the object.

6. The apparatus of claim 1, further comprising evaluation logic to evaluate the digital image to determine one or more deficiencies associated with the digital image, wherein the one or more deficiencies include distortion of blurring of one or more transition portions of the digital image.

7. The apparatus of claim 6, wherein a transition portion of the one or more transitions portions includes transition curves where a first color transitions into a second color.

8. The apparatus of claim 7, wherein the transition curves and accuracy of depth estimated along the transition curves are localized, wherein the depth is estimated using the depth-sensing camera.

9. A method comprising:
    detecting a digital image of an object, wherein detecting further includes detecting a pattern signal associated with the digital image;
    measuring a spread function relating to at least one of the digital image and an imaging system of a computing device, wherein the digital image is captured by one or more components of the imaging system including a depth-sensing camera,
    wherein measuring further includes determining deconvolution of the spread function, and
    wherein measuring further includes computing a pre-shaping filter based on the deconvolution of the spread function; and
    executing the pre-shaping filter to:
    apply the pattern signal to the deconvolution of the spread function to obtain a pre-shaped projection pattern of the digital image, wherein the pre-shaped projection pattern to reveal one or more black regions and one or more white regions of the digital image, and
    filter-out black from the one or more black regions and white from the one or more white regions, and replace the filtered-out black and the filtered-out white with dark gray and bright gray, respectively, to sharpen the digital image.

10. The method of claim 9, wherein the digital image is projected by one or more projectors of the imaging system based on the pre-shaped projection pattern.

11. The method of claim 9, wherein the digital image comprises a three-dimensional (3D) object that is received or captured using the one or more components including the depth-sensing camera.

12. The method of claim 9, wherein the spread function is measured based on one or more components of the image system, wherein the one or more components include at least one of the depth-sensing camera, a projector, one or more lenses of the depth-sensing camera, one or more sensors, and one or more detectors.

13. The method of claim 12, wherein the spread function comprises a point spread function (PSF) to describe a response of the one or more components of the imaging system to a point source or a point object relevant to the object.

14. The method of claim 9, further comprising evaluating the digital image to determine one or more deficiencies associated with the digital image, wherein the one or more deficiencies include distortion of blurring of one or more transition portions of the digital image.

15. The method of claim 14, wherein a transition portion of the one or more transitions portions includes transition curves where a first color transitions into a second color.

16. The method of claim 15, wherein the transition curves and accuracy of depth estimated along the transition curves are localized, wherein the depth is estimated using the depth-sensing camera.

17. At least one non-transitory machine-readable medium comprising a plurality of instructions, executed on a computing device, to facilitate the computing device to perform one or more operations comprising:
    detecting a digital image of an object, wherein detecting further includes detecting a pattern signal associated with the digital image;
    measuring a spread function relating to at least one of the digital image and an imaging system of the computing device, wherein the digital image is captured by one or more components of the imaging system including a depth-sensing camera,
    wherein measuring further includes determining deconvolution of the spread function, and
    wherein measuring further includes computing a pre-shaping filter based on the deconvolution of the spread function; and
    executing the pre-shaping filter to:
    apply the pattern signal to the deconvolution of the spread function to obtain a pre-shaped projection pattern of the digital image, wherein the pre-shaped projection pattern to reveal one or more black regions and one or more white regions of the digital image, and
    filter-out black from the one or more black regions and white from the one or more white regions, and replace the filtered-out black and the filtered-out white with dark gray and bright gray, respectively, to sharpen the digital image.

18. The non-transitory machine-readable medium of claim 17, wherein the digital image is projected by one or more projectors of the imaging system based on the pre-shaped projection pattern.

19. The non-transitory machine-readable medium of claim 17, wherein the digital image comprises a three-dimensional (3D) object that is received or captured using one or more components including the depth sensing camera.

20. The non-transitory machine-readable medium of claim 17, wherein the spread function is measured based on one or more components of the image system, wherein the one or more components include at least one of the depth-sensing camera, a projector, one or more lenses of the depth-sensing camera, one or more sensors, and one or more detectors.

21. The non-transitory machine-readable medium of claim 20, wherein the spread function comprises a point spread function (PSF) to describe a response of the one or more components of the imaging system to a point source or a point object relevant to the object.

22. The non-transitory machine-readable medium of claim 17, wherein the one or more operations further comprise evaluating the digital image to determine one or more deficiencies associated with the digital image, wherein the one or more deficiencies include distortion of blurring of one or more transition portions of the digital image.

23. The non-transitory machine-readable medium of claim 22, wherein a transition portion of the one or more transitions portions includes transition curves where a first color transitions into a second color.

24. The non-transitory machine-readable medium of claim 23, wherein the transition curves and accuracy of depth estimated along the transition curves are localized, wherein the depth is estimated using the depth-sensing camera.

* * * * *

UNITED STATES PATENT AND TRADEMARK OFFICE
CERTIFICATE OF CORRECTION

PATENT NO.         : 9,792,673 B2
APPLICATION NO.    : 14/865166
DATED              : October 17, 2017
INVENTOR(S)        : Surazhsky et al.

It is certified that error appears in the above-identified patent and that said Letters Patent is hereby corrected as shown below:

In the Claims

In Column 20, in Claim 1, Line 42 delete "compounds" and insert -- components --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*